Feb. 15, 1949. S. C. BARNES 2,461,955
NO-DRAFT VENTILATING WINDOW FOR AUTOMOBILES
Filed May 30, 1945

INVENTOR.
STUART C. BARNES
BY
Barnes, Kisselle, Laughlin & Raisch
Attorneys

Patented Feb. 15, 1949

2,461,955

UNITED STATES PATENT OFFICE 2,461,955

NO-DRAFT VENTILATING WINDOW FOR AUTOMOBILES

Stuart C. Barnes, Detroit, Mich.

Application May 30, 1945, Serial No. 596,750

4 Claims. (Cl. 296—44)

This invention relates to no-draft ventilation for automobiles and other vehicles.

"No-draft ventilation" is described and claimed in the Alfred J. Fisher Patent No. 2,048,605, dated July 21, 1936. This system of ventilation was, when first introduced, very successful and has been used on nearly all cars that have been produced in the last decade. This Fisher system was very effective for indirect ventilation when the swinging panel is swung only part way outwardly and direct ventilation when the swinging panel has been turned to a position approaching, at, or beyond the 90° position. However, in the last few years the streamline design for bodies has brought about a sharp inclination of the windshield pillars. The result has been that on most bodies the upper pivot of the swinging panel is now located only about half way or a less distance up the inclined pillar and not at or near the top of the pillar, as shown in the Fisher patent. The result is that the area of the forward portion of the swinging panel and the area of the opening leading into the body when the panel has been turned outwardly has been greatly diminished. Furthermore, instead of the air coming into the body at the height of the occupant's head and all along the window opening from top to bottom, the entry of the air is confined to the lower half of the swinging panel, considerably below the occupant's face. The center of the volume of air coming into the car is at the very bottom of the window opening. In the summertime and very hot weather the amount of air coming through the panel is altogether insufficient and the location and vertical spread of the air blast coming through the forward portion of the window opening is not adapted to provide the cooling ventilation which is desirable and necessary for comfort.

Furthermore, with these swinging panels as now constructed and mounted with the new style bodies, only the lower half of the rear portion of the panel when swung outwardly functions to arrest and force air into the body. The upper half of the panel arrests the air but there is no opening adjacent the upper half of the panel for the air to go into the body except the opening behind the panel. In order to prevent undesired entry of the air and weather into the body over the top of the panel, a wide trough or shield has to be attached to the top of the post. The result is that almost all of the air goes over the top of the rear portion of the panel and along the outside of the body and not into the body. Such currents of air, if any, that stray into the body, come in at an undesired point and do not materially help in cooling the occupant of the seat. It is disadvantageous to have air come into the body over the top of the panel for the reason that what air comes in here cuts down the amount of air that comes through the opening in front of the pivots where it is wanted. The reason for this is that this no-draft ventilating panel, when swung outwardly, tends to create a vacuum in the car by drawing air out of the car by aspirating action and also by reason of shoving the air out of the space through which the outstretched panel passes. The air which comes through the opening at the front of the pivots tends to replenish the air shoved out of this space. If some of the air to replete this evacuated zone comes over the top of the panel, as is the case with the two-panel closure used with these sharply inclined posts, then the air that can be forced into the body forward of the pivots is materially diminished and, consequently, the cooling effects upon the occupant of the seat are impaired.

It has been proposed to remedy these shortcomings by pivoting the panel on an inclined axis at an inclination that approximates parallelism with the windshield pillar, that is, the lower pivot is located at substantially the same point but the rear pivot is placed at the top and at the extreme rear edge of the panel. (See Lane No. 2,183,684, for an example). One of the objects stated for this ventilator pivoted upon a diagonal axis is that, without a guard or shield, it prevents rain from coming into the car over the top of the swinging panel which would otherwise occur. But this diagonal pivot arrangement has been found not altogether satisfactory for some of the air which might otherwise be forced through the opening at the front of the pivots slides over the top of the panel by reason of its sharp inclination and the air coming through the front of the window opening is directed sharply downward and not in a direction calculated to best cool the occupant of the seat, as is the case where the air stream is a horizontal one.

It is the object of my improvement to provide a three-panel closure in which the swinging panel is in a much better shape and position to cool the occupant of the seat. The front ventilating opening extends substantially the entire height of the window and, therefore, has a much greater area to admit a larger volume of air; the width of the forward section of the swinging panel can be diminished so as to decrease the projection of the panel inside the body where it may interfere with steering when the panel is opened wide; the necessity of a guard or shield for air and weather coming over the top of the panel behind the pivots is eliminated; and much better results are obtained in keeping the car free from gas fumes when the ventilating panel is opened only slightly for indirect ventilation, as will be fully explained hereinafter.

Figure 1:
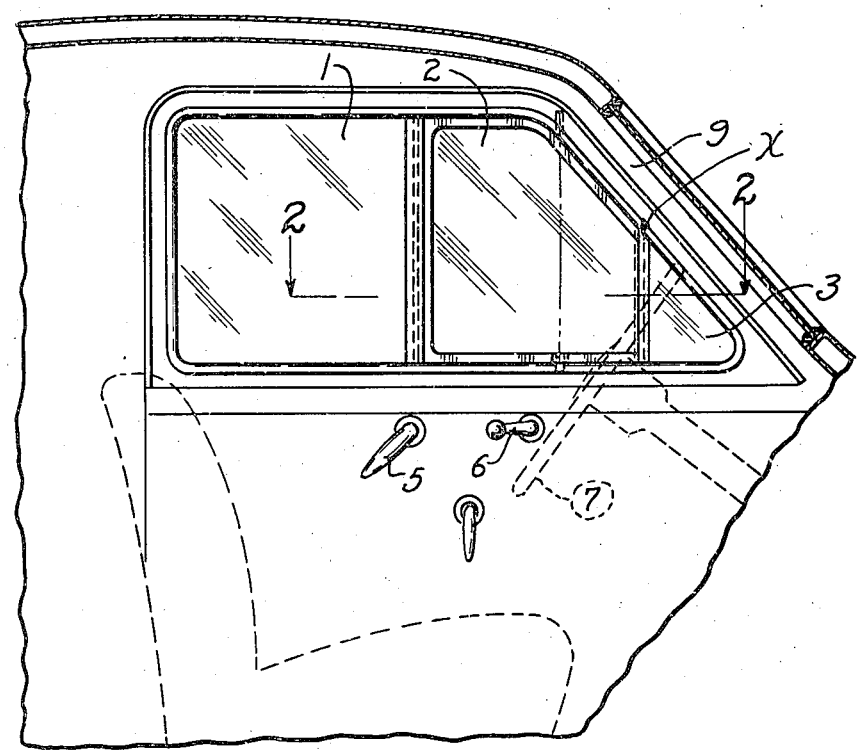
Fig. 1 is an inside view of an automobile door provided with my improvement.
Figure 2:
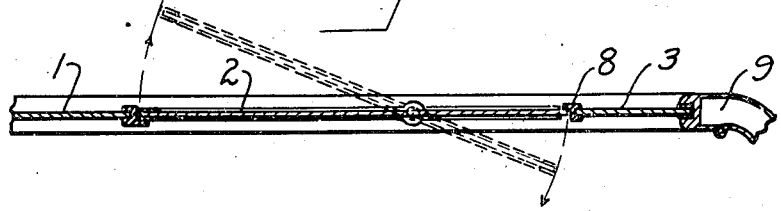
Fig. 2 is a section on the line 2—2 of Fig. 1.
Figure 3:
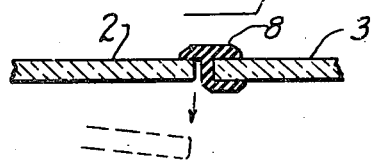
Fig. 3 is a fragmentary section on the same line but enlarged to show one way of sealing the joint between the glass panels.

The window is divided into three panels: 1 is the usual sliding panel adjustable up and down with the usual window regulator indicated in a general way by crank 5. 2 is a swinging ventilating panel which may be used with or without a crank and worm gear type of regulator indicated in a general way by crank 6. 3 is a separate glass gusset panel preferably stationary and located forward of the swinging panel. In the present type of no-draft ventilation used with a windshield pillar which has the slope shown in Fig. 1, the pivot is located at substantially the point marked X—more than half way down the inclined post 9. This results in a very small section of the panel forward of the pivots. This section is substantially the size of my panel 3 and the opening forward of the swinging panel will, therefore, be very much diminished compared to what it was with bodies having quite erect windshield pillars.

What I propose to do is move the pivots backwardly from the point X substantially the same distance as the width of the swinging panel forward of the old pivot line. This brings the pivot line slightly back of the steering wheel 7 and brings the pivot line much closer to the occupant or driver of the vehicle. Hence, when the panel is turned 90° the air blast is more nearly directly on the occupant in place of being considerably forward of the occupant where the blast tends to overthrow forward of and to the side of the seat occupant. This arrangement brings the abutting sash bars of the sliding panel 1 and the swinging panel 2 or the narrow window channel, if a channel is used, considerably back of the point where it has customarily been and out of the line of vision of the driver or occupant as he looks forwardly and laterally. The bars or channel are much less objectionable in this position than they were in the old construction. The rubber weatherseal 8 between the swinging panel and the forward gusset panel is in a position where it is entirely unobjectionable because it is considerably below the line of vision of the driver and only obstructs his vision for a very small area on the pavement immediately forward and laterally at a position where there ordinarily is no occasion to make observations in driving the car. This rubber strip 8 is a channel strip with a weathersealing fin. The channel portion fits tightly to one of the panel edges. Such a strip has been used upon the old style two-panel windshields (McCormick No. 1,259,117). Of course, properly sealing channel sash bars can be used, if preferred.

It will be seen by looking at the drawing that the area of the forward section of the swinging panel with respect to the stationary forward panel is substantially three to one. Calculating roughly, the stationary panel is approximately half the size of the lower portion of the forward section of the swinging panel. That inclined forward section of the swinging panel above the stationary panel approximates the size of the stationary panel. It will thus be seen that the area for the entry of air, when the swinging panel is turned to the near 90° position, is much greater than with the present type of no-draft ventilators. It will also be seen that inasmuch as the rear section of the swinging panel is substantially all of the full height of the window a greater panel area will intercept the air passing the sides of the body when the vehicle is in transit and, consequently, there is a greater collection and massing of air to be directed into the vehicle.

This view (Fig. 1) shows near maximum possibilities in air arresting and diversion into the vehicle. Inasmuch as the entry of air by the arrangement shown in the drawings is almost trebled over the old arrangement with the two-panel window, it will be obvious that the stationary panel or gusset panel might very well be extended rearwardly somewhat, say even one-third or one-half further than what appears in the drawings, and one would still have a considerably larger entry space for the air than is the case with the old design in the two-panel window. What air does come through is better directed to cool the occupant of the seat and the amount of projection of the window inside near the steering wheel is shortened and, consequently, there is less possibility of interference.

With my three-panel system improved results are obtained with indirect ventilation, that is, where the swinging panel is "cracked" open a short distance and air is drawn out of the interior of the body by an aspirating action as the car travels through the atmosphere. With the heretofore existing two-panel design where the sharply inclined windshield pillar is used, the opening in the lower half of the window being as small as it is, there is a tendency to create a subatmospheric pressure in the interior of the car. The aspirating action of the partially open swinging panel draws the air out of the vehicle faster than it is taken in through the restricted opening especially when the car is traveling at high speed. This brings about a condition where gas fumes due to an improperly positioned exhaust pipe or a leaky muffler or exhaust pipe tend to be driven into the interior of the car by the slight difference in pressure. Many motorists have experienced this trouble of fumes being forced into the car. This sometimes becomes even dangerous. This flow of the exhaust fumes into the car obviously is augmented by any means that tends to create a subatmospheric pressure inside the car. The present design of no-draft ventilators of the two-panel window type creates this condition. The swinging panel, with the present setting of the pivot at the midpoint of the inclined pillar, can be "cracked" open say half an inch at the rear and the opening at the front of the panel, by reason of the upper inclined edge, will vary in width from nothing at the upper pivot and at the extreme forward point of the panel to about one-half the width of the opening at the rear edge of the panel. If one will examine this opening and compare it with the opening at the rear of the swinging panel he will be surprised how extremely small the forward opening is compared to the rear.

My improvement affords the same small opening at the top of the panel but adds a fairly large opening forward of the vertical edge of the swinging panel. Hence, with my three-panel system indirect ventilation is much more efficacious.

What I claim is:

1. In an automobile body having a sharply rearly inclined windshield pillar, a door or body portion having a correspondingly sharply rearly inclined complementary front post and an adjoining window opening, a three-panel closure for said opening comprising a forward gusset panel with a substantially vertical rear edge and closing the triangular lower forward portion of the window opening, a swinging glass panel with a substantially vertical front lower edge and immediately to the rear of said gusset panel and in the plane thereof when closed, said glass panel pivoted to swing on a substantially erect axis and having a forward section of substantially greater dimensions than the gusset panel and arranged to turn inwardly and a major rear section arranged to turn outwardly into the air stream as the vehicle moves through the atmosphere, the said swinging panel arranged to swing through angles considerably less than 90° to afford indirect ventilating action and to swing out near to, at and beyond the 90° position to afford a forced direct ventilation into the interior of the vehicle, and a third up and down sliding panel section closing the remainder of the window opening and forming a valve member to cooperate with the swinging panel in controlling the ventilation through the said window opening.

2. In an automobile body having a sharply inclined windshield pillar, a door or body portion having a correspondingly sharply rearwardly inclined complementary front post and an adjoining window opening, a three-panel closure for said opening comprising a forward stationary triangular glass panel having a substantially vertical rear edge closing the lower forward portion of the window opening, a swinging glass panel immediately to the rear of said stationary panel with substantially vertical rear and front lower edge portions and in the plane thereof when closed, said glass panel pivoted to swing in a substantially horizontal direction on a substantially vertical axis, said panel having a section of substantially greater area to the rear of the pivots than the section forward of the pivots, and a substantially vertically sliding panel to the rear and in the plane of the swinging panel when the latter is closed and completing the closure of the window opening, said movable panels being adjustable to various positions in their movement to control the ventilation into the car.

3. In an automobile body having a sharply rearwardly inclined windshield pillar and an adjoining door provided with a window opening and a forward post arranged to abut the windshield pillar when the door is closed, a three-panel glass closure for said opening, the panels being arranged to occupy one plane when closed and comprising a forward stationary triangular glass panel adjacent the door post, an intermediate swinging panel arranged to swing on a substantially vertical axis and having a forward section of substantially less area than the section to the rear of the pivots, the lower front edge of the swinging panel and the rear edge of the stationary panel being substantially vertical and arranged in weathersealing engagement when the swinging panel is closed, and a rear vertical sliding section completing the closure of the window opening, the said intermediate swinging section being adjustable to various positions to a 90° or larger angle to the side of the body and the vertically sliding window being adjustable to various vertical positions to cooperate with the swinging panel in ventilating the body.

4. In a vehicle body having a forward sharply rearwardly inclined windshield pillar and a body portion to the rear of the pillar having a window opening with a sharply inclined window post, a three-glass-panel window opening closure all located in one plane when the panels are closed and comprising a forward triangular panel located immediately at the rear of the forward window post, an intermediate section arranged to swing on a substantially vertical axis and having a rear portion of substantially greater area than the forward portion, a weatherseal between the forward edges of the swinging panel and the adjoining edge of the forward panel and a sliding rear vertical panel completing the closure of the window opening, the said swinging panel and the sliding panel being adjustable to various positions to provide ventilation of the interior of the body and the swinging panel affording indirect ventilation when it is swung slightly outwardly and affording direct blast ventilation when it is swung to a near 90° or greater angle.

STUART C. BARNES.

REFERENCES CITED

The following references are of record in the file of this patent:

UNITED STATES PATENTS

| Number | Name | Date |
| --- | --- | --- |
| 1,985,538 | Fergueson | Dec. 25, 1934 |
| 2,048,605 | Fisher | July 21, 1936 |
| 2,060,615 | Ernst | Nov. 10, 1936 |
| 2,274,824 | Clark | Mar. 3, 1942 |